United States Patent [19]

Shimizu

[11] Patent Number: 5,059,001

[45] Date of Patent: Oct. 22, 1991

[54] NON-LINEAR OPTICAL DEVICE WITH QUANTUM MICRO HETERO STRUCTURE

[75] Inventor: Akira Shimizu, Inagi, Japan

[73] Assignee: Canon Kabushiki Kaisha, Tokyo

[21] Appl. No.: 618,585

[22] Filed: Nov. 28, 1990

Related U.S. Application Data

[63] Continuation of Ser. No. 295,882, Jan. 12, 1989, abandoned.

[30] Foreign Application Priority Data

Jan. 14, 1988 [JP] Japan ................................ 63-007299

[51] Int. Cl.$^5$ .......................... G02F 1/01; H03F 7/00; H01L 27/12
[52] U.S. Cl. ............................................ 359/24; 3/3; 350/355; 357/4; 359/328; 307/427; 359/326
[58] Field of Search ...................... 350/354, 355, 356; 372/21, 22; 307/425, 427, 428; 357/4

[56] References Cited

U.S. PATENT DOCUMENTS

| | | | |
|---|---|---|---|
| 3,430,061 | 2/1969 | Smith | 307/427 |
| 3,770,336 | 11/1973 | Roess | 307/425 X |
| 4,427,260 | 1/1984 | Puech et al. | 307/427 X |
| 4,510,402 | 4/1985 | Summers et al. | 307/427 |
| 4,880,297 | 11/1989 | Fejer et al. | 350/355 |

OTHER PUBLICATIONS

*Applied Physics Letters*, vol. 51, No. 25, Dec. 21, 1987, pp. 2100–2102, American Institute of Physics, N.Y. Kkurgin, J. "Second-Order susceptibility of Asymmetric Coupled Quantum Well Structures".

*I.E.E.E. Journal of Quantum Electronics*, Col. QE-19, No. 5, May 1983, pp. 791–794, N.Y. Gurnick, M., et al., "Synthetic Nonlinear Semiconductors".

*Primary Examiner*—Eugene R. LaRoche
*Assistant Examiner*—Michael Shingleton
*Attorney, Agent, or Firm*—Fitzpatrick, Cella, Harper & Scinto

[57] ABSTRACT

An non-linear optical device for generating light of an angular frequency $2\omega$ from incident light of an angular frequency $\omega$ by means of a non-linear optical effect, comprises a substrate body, formed by a semiconductive or insulating material;

an embedded member embedded in the substrate body and formed by a direct-transition type semiconductive or insulating material different from the material constituting the substrate body, having a band gap Eg satisfying a relation $Eg \approx 2n\omega$ in which $n = h/2\pi$ and h is Planck constant, and having a size comparable to that of an exciton, and in this device, an asymmetric potential is provided to each of an electron and positive hole in said embedded member in such a manner that the wave functions of the electron and positive hole have mutually different centers of gravity fron each other.

16 Claims, 4 Drawing Sheets

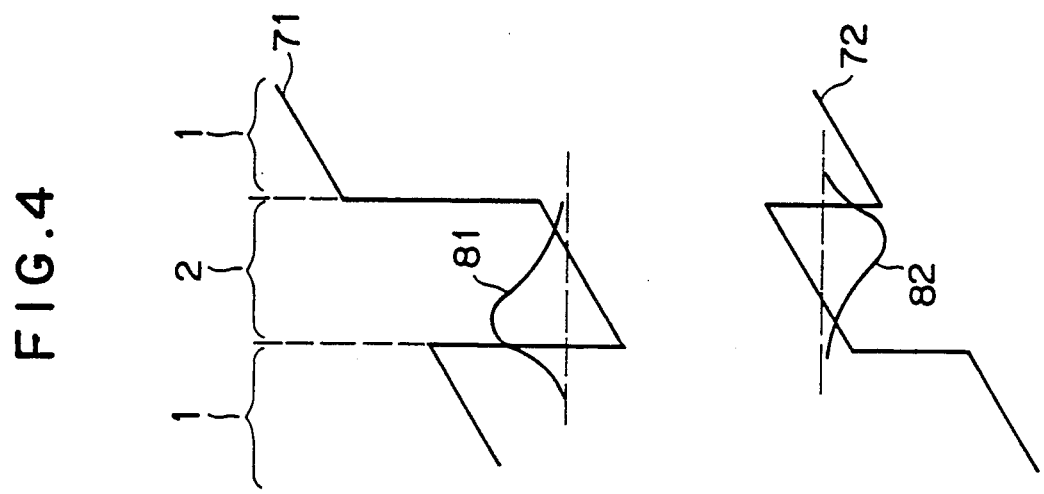
F I G. 4
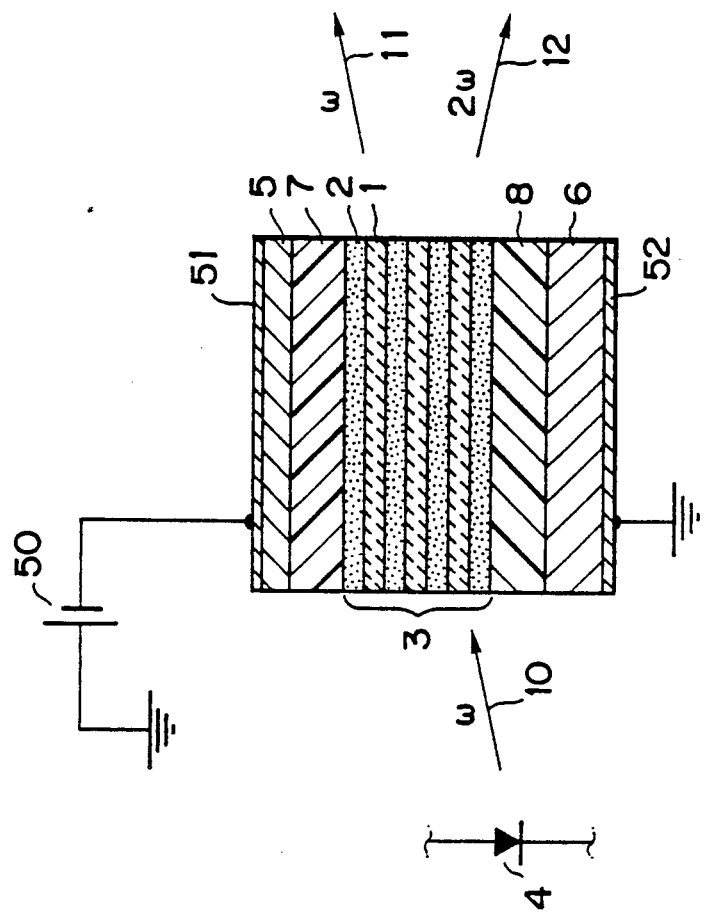
F I G. 3

NON-LINEAR OPTICAL DEVICE WITH QUANTUM MICRO HETERO STRUCTURE

This application is a continuation of application Ser. No. 07/295,882 filed Jan. 12, 1989 now abandoned.

BACKGROUND OF THE INVENTION

1. Field of the Invention

The present invention relates to a non-linear optical device for obtaining light of a shorter wavelength, utilizing a non-linear optical effect.

2. Related Background Art

There has conventionally proposed a device for generating harmonic waves in order to obtain light of a shorter wavelength. Such device is schematically shown in FIG. 1.

In FIG. 1, a basic wave 32 of an angular frequency $\omega$ emitted from a semiconductor laser 31 enters a non-linear optical crystal 30 composed, for example, of LiNbO$_3$ or KDP, thereby generating a harmonic wave 34 of an angular frequency $2\omega$, together with a transmitted wave 33 of the angular frequency $\omega$.

Also for modulating such harmonic wave, there is already known a device as shown in FIG. 2, in which the same components as those in FIG. 1 are represented by the same numbers and will not be explained further. In said device, the non-linear optical crystal is replaced by a polar macromolecular material 35, to which a bias field is applied by a power source 38, with modulation by a modulator 39. When the bias field is turned on, the molecules of said polar macromolecular material 35 are aligned in a same direction, whereby the non-linear receptivity $\chi^{(2)}$ is elevated to generate the harmonic wave 34. When the bias field is turned off, the orientation of the molecules is thermally disturbed to reduce $\chi^{(2)}$, whereby the harmonic wave 34 is decreased.

However these devices have been associated with following drawbacks;

1) Efficiency of harmonic wave generation is low, due to low non-linear receptivity $\chi^{(2)}$;

2) It is difficult to prepare such device in combination with a light-emitting device such as a semiconductor laser, on a same substrate;

3) In case of the device shown in FIG. 1, the non-linear optical crystal of satisfactory quality is costly to prepare; and 4) In case of the device shown in FIG. 2, the response is as low as several milliseconds, as it is determined by the orientation by molecular rotation by the bias field.

SUMMARY OF THE INVENTION

An object of the present invention is to provide a non-linear optical device which is not associated with the above-mentioned drawbacks of the prior technology, is inexpensive in preparation, and has a high efficiency of harmonic wave generation.

Another object of the present invention is to provide a non-linear optical device capable of modulating the harmonic wave with a high response speed.

The above-mentioned objects can be achieved by forming, in a semiconductive or insulating substrate body, a non-linear optical device for generating light of an angular frequency $2\omega$ from incident light of an angular frequency $\omega$ by means of a direct-transition semiconductive or insulating embedded member embedded therein, which is different from the material of said substrate body, has a band gap Eg satisfying a relation Eg$\approx$2h$\omega$ wherein h=h/2$\pi$ and h is Planck constant, and is of a size approximately equal to that of the exciton, and by providing an asymmetric potential to the electron and positive hole in such a manner that the wave functions have different centers of gravity for the electron and positive hole in said embedded member.

More specifically, the device of the present invention is based on a phenomenon, found for the first time by the present inventor, in a so-called quantum micro hetero structure (QMHS) formed by a direct-transition semiconductive or insulating member of a size comparable to the Bohr radius of the exciton embedded in a substrate body formed by a semiconductive or insulating material, such that by applying potentials of an electron and positive hole having different centers of gravity a very large dipole moment is provided to the exciton thereby obtaining a very large non-linear receptivity $\chi^{(2)}$ to the light satisfying a relation 2h$\omega \approx$ Eg.

Such asymmetric potential can be realized by applying a bias electric field to the quantum micro hetero structure. The modulation of the harmonic wave can be achieved by modulating said bias electric field, with a high response speed shorter than a picosecond, since a slow process such as molecular rotation is not involved.

BRIEF DESCRIPTION OF THE DRAWINGS

FIG. 3 is a schematic cross-sectional view of a non-linear optical device embodying the present invention;

FIGS. 4 and 5 are charts showing the energy bands in a part of the potential well structure in the present invention;

DETAILED DESCRIPTION OF THE PREFERRED EMBODIMENTS

Figure 1:
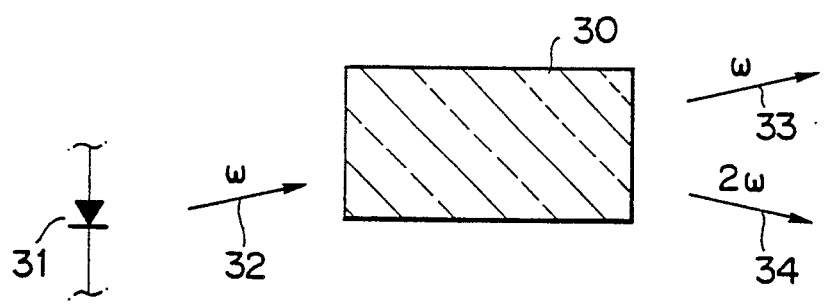
FIGS. 1 and 2 are schematic views of conventional harmonic wave generating devices.
Figure 2:
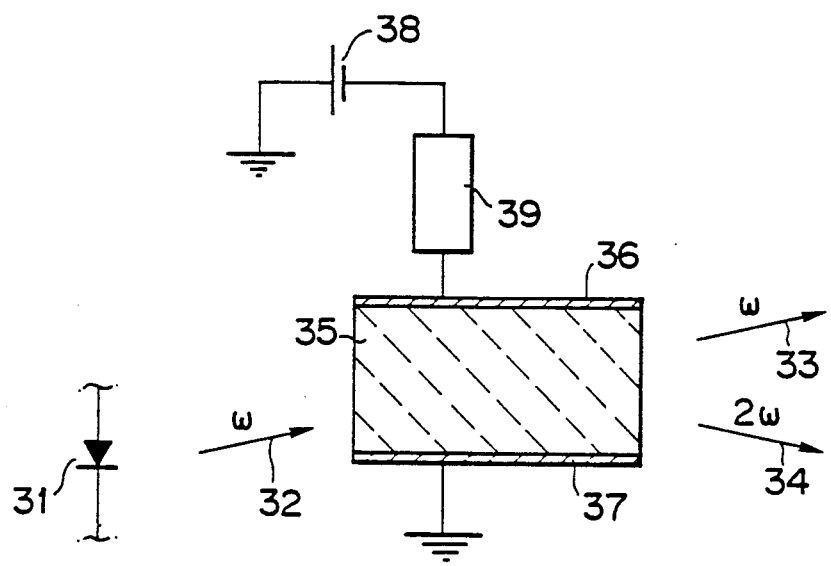

Now the present invention will be clarified in detail by embodiments thereof shown in the attached drawings.

FIG. 3 is a schematic cross-sectional view showing a first embodiment of the non-linear optical device of the present invention, wherein shown are a substrate body semiconductor 1 composed of non-doped AlAs, and an embedded semiconductor 2 composed of non-doped GaAs. The substrate body semiconductor 1 and the embedded semiconductor 2 are alternately laminated in plural cycles to constitute a quantum well structure (QWS) 3 which is one of the quantum micro hetero structures. The embedded semiconductor 2 has a thickness of 120 Å which is approximately equal to the Bohr radius of the exciton in GaAs. On both sides of the quantum well structure 3, there are respectively provided a p-area 5 and an n-area 6 for ohmic contact and electrodes 51, 52. Charge separating layers 7, 8, composed of non-doped AlAs, are provided in order to prevent the migration of the carriers from the areas 5, 6 to the quantum well structure 3. A bias electric field is applied between the electrodes 51, 52 by means of a power source 50.

The working principle of the above-explained device is as follows. FIG. 4 is a chart showing the energy bands in a part of the quantum well structure 3 shown in FIG. 3, wherein shown are an energy 71 at the bottom of the conduction band; an energy 72 at the top of the valence electron band; a wave function 81 of the electron; and a wave function 82 for the positive hole. The potential is generally inclined, as the bias electric field is applied to the quantum well structure 3 by means of the power source 50. Consequently the potentials for the electron and for the positive hole are asymmetric, and the corresponding wave functions 81, 82 have mutually different centers of gravity. As a result, the exciton defined by the bound state of the electron and the positive hole, has a large dipole moment. This signifies that the entire quantum well structure 3 has a large non-linear receptivity $\chi^{(2)}$. For example, the value of $\chi^{(2)}$ of the quantum well structure 3 composed of GaAs/AlGaAs is 400 times as large as that of $LiNbO_3$, or 5000 times as large as that of KDP.

When a basic wave 10 of an angular frequency $\omega$ emitted, for example, from a semiconductor laser as shown in FIG. 1 (satisfying a relation $2\hbar\omega \simeq Eg$ wherein Eg is the band gap of the embedded semiconductor, $h = h/2\pi$ and h is Planck constant) passes through said quantum well structure 3, a part of said basic wave is transmitted as the transmitted wave 11 of the angular frequency $\omega$, but the remaining part is converted into a harmonic wave 12 of an angular frequency $2\omega$. Said conversion is conducted very efficiently, as the efficiency of conversion is proportional to the square of $\chi^{(2)}$.

In the foregoing embodiment the device is formed from GaAs and AlAs, but it is also possible to employ $Al_xGa_{1-x}As$ for the semiconductors 1, 2 and the layers 7, 8. The refractive index of the quantum well structure 3 becomes larger than that of the layers 7, 8 if the average value of x of the quantum well structure 3 is sselected smaller than that of the layers 7, 8. In this manner, the entire quantum well structure 3 constitutes a wave guide structure, thereby confining the light therein and increasing the concentration thereof, and further increasing the efficiency of generating the harmonic wave. The same principle applies to materials other than $Al_xGa_{1-x}As$, as long as the composition is so selected that the refractive index of the quantum well structure 3 becomes larger than that of the layers 7, 8. Also the device of the present invention, as being composed of a compound semiconductor, can be monolithically formed on a same substrate with a light-emitting device such as semiconductor laser which is similarly composed of a compound semiconductor.

Figure 5:
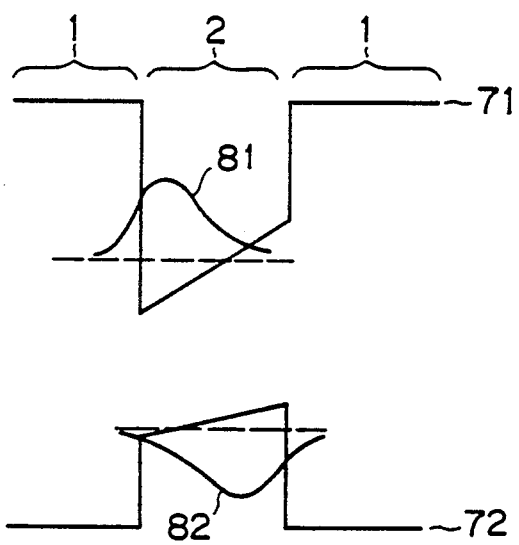

In the foregoing embodiment, the asymmetric potential is realized by an externally applied bias electric field, but such asymmetric potential may also be realized by locally varying the composition of the embedded semiconductor. FIG. 5 shows energy bands in such embodiment. In this embodiment the substrate body semiconductor 1 is composed of AlAs, while the embedded semiconductor 2 has a gradually varying composition from $(InAs)_{1-x}(GaAs)_x$ to $(GaSb)_{1-y}(GaAs)_y$ in the direction of thickness, so that the energy level 71 at the bottom of the conduction band and the energy level 72 at the top of the valence electron band are inclined in the embedded semiconductor 2. Consequently the wave functions 81, 82 for the electrons and for the positive holes have mutually different center of gravity, so that the harmonic wave can be generated with a high efficiency as in the foregoing embodiment. Such structure allows to dispense with the power source 50 and the electrodes 51, 52 shown in FIG. 3, since the application of the bias electric field is no longer necessary. The variation in composition can be achieved, for example, by "type II staggered superlattice" reported by L. Esaki in IEEE J. Quantum Electronics, QE-22, P1611 (1986).

Figure 6:
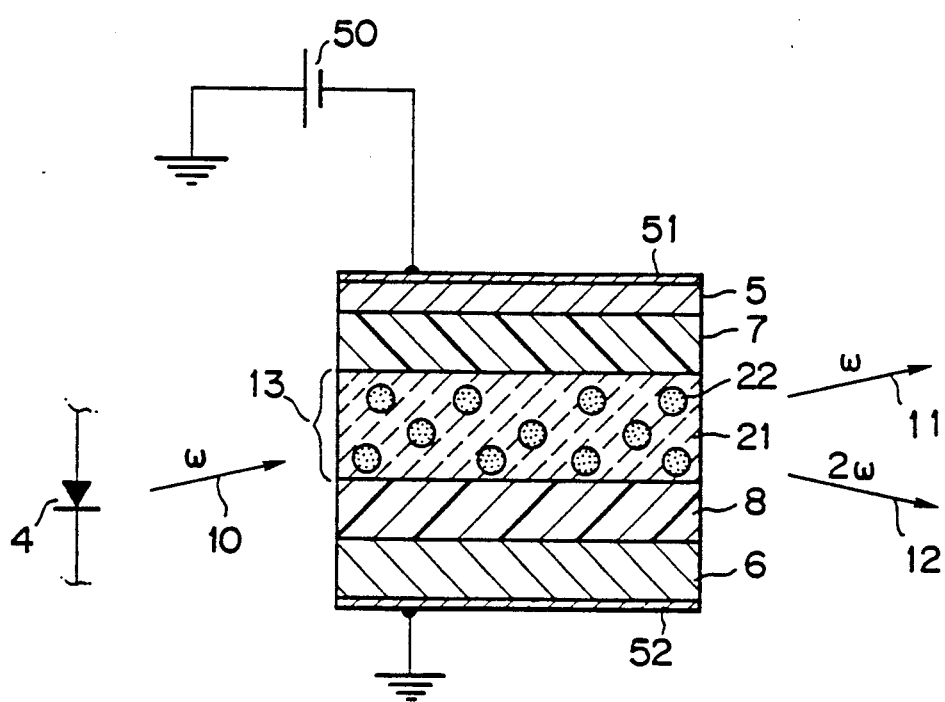
FIGS. 6, 7 and 8 are schematic cross-sectional views of other embodiments of the present inventions.

FIG. 6 is a schematic cross-sectional view showing a second embodiment of the non-linear optical device of the present invention, wherein the same components as those in FIG. 3 are represented by the same numbers and will not be explained further.

In the present embodiment, the quantum micro hetero structure is composed, instead of the quantum well structure 3 explained above, in a quantum dot (QD) structure 13, that is composed of ZnSe particles 2 of a size of about 50 Å, embedded in a glass 21 as a substrate body. Also in the present embodiment, the harmonic wave can be generated with a high efficiency, by a bias electric field applied by the power source 50.

Figure 7:
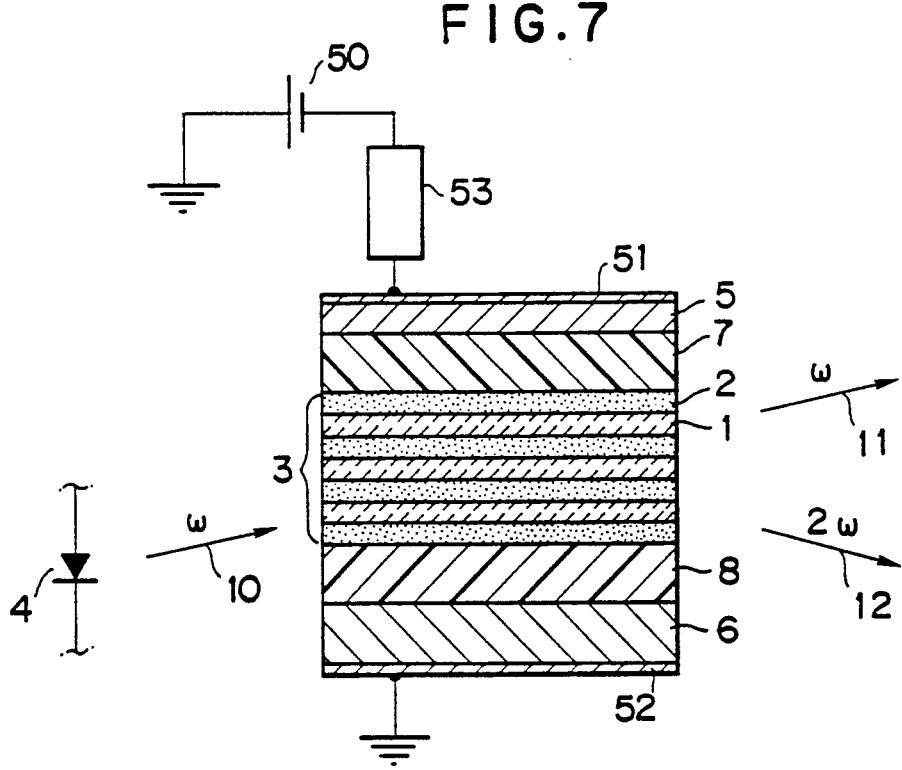

FIG. 7 is a schematic cross-sectional view of a third emboidment of the non-linear optical device of the present invention, wherein the same components as those in FIG. 3 are represented by the same numbers and will not be explained further.

The present embodiment is different from the first embodiment in the presence of a modulator 53 for modulating the bias electric field supplied by the power source 50. Said modulator 53 may be composed, for example, of an ordinary switch. The turning on and off of the bias electric field by the modulator 53 varies $\chi^{(2)}$, thereby modulating the harmonic wave 12, with a response speed shorter than a picosecond as explained before. In the present embodiment, the actual response speed is determined by the CR time constant in the circuit, and can be actually reduced to the order of picosecond. Also in the present embodiment, the quantum well structure 3 may be replaced by a quantum dot layer 13 as shown in FIG. 6.

Figure 8:
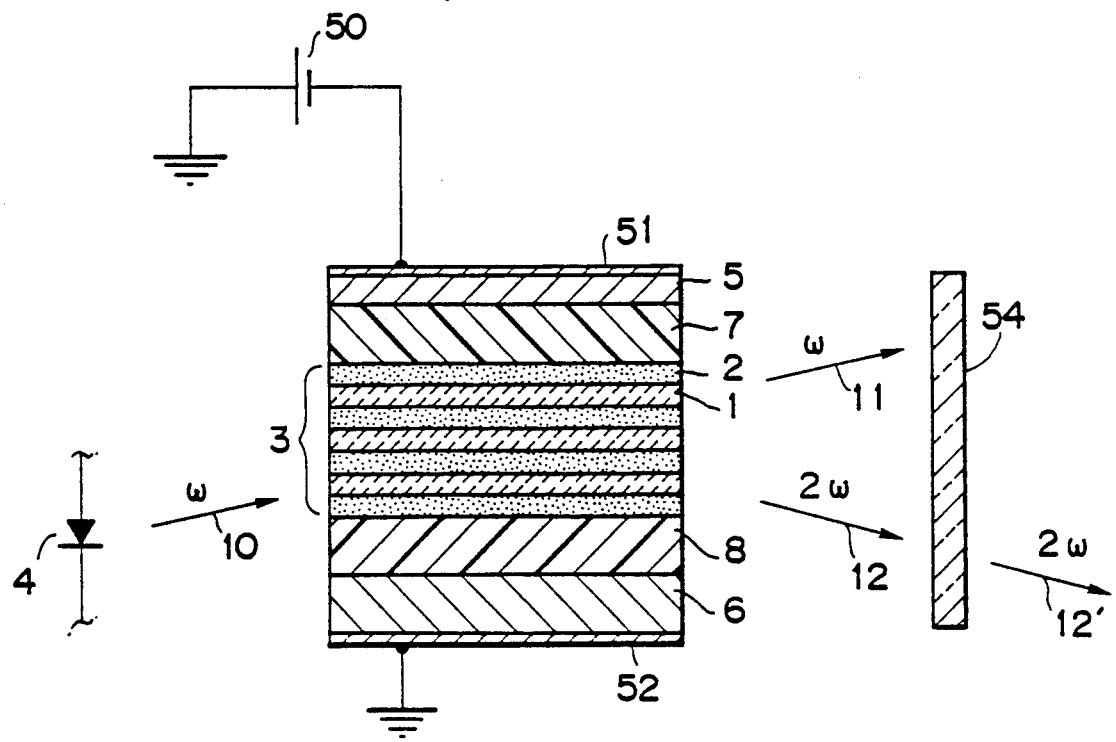

FIG. 8 is a schematic cross-sectional view showing a fourth embodiment of the non-linear optical device of the present invention, wherein the same components as those in FIG. 8 are represented by the same numbers and will not be explained further.

The present embodiment is different from the first embodiment in the presence of a filter 54 for selectively separating the harmonic wave, at the exit side of the quantum well structure 3. Said filter 54 may be composed of a color glass, a multi-layer coated glass or a diffraction grating. Said filter 54 is so designed as to transmit the harmonic wave 12 of angular frequency $2\omega$ but to intercept the transmitted wave 11 of angular frequency $\omega$. Consequently the device emits the harmonic wave 12' only, and it is rendered possible to prevent the influence of the transmitted wave 11 in the utilization of said harmonic wave 12'. Also in the present embodiment, the quantum well structure 3 may be replaced by the quantum dot layer 13 as shown in FIG. 6. Also the composition of the embedded layer may be gradually varied as shown in FIG. 5. Furthermore, the use of a modulator 53 as shown in FIG. 7 allows to obtain the modulated harmonic wave only from the device.

In addition to the foregoing embodiments, the present invention is subject to various modifications. For example, in addition to the quantum well structure and quantum dot structure explained above, a quantum line (QL) structure may be adopted as the quantum micro hetero structure. Such quantum dot structure or quantum line structure provide a non-linear receptivity $\chi^{(2)}$ larger than that obtainable with the quantum well structure. Also the materials constituting the device are not limited to those described in the foregoing embodiments, but may be composed, for example, of II–IV group semiconductor. The present invention includes all these modifications within the scope and spirit of the appended claims.

As detailedly explained in the foregoing, the non-linear optical device of the present invention, in which asymmetric potentials are given to the quantum micro hetero structure, provides the advantages of:

i) generating the harmonic wave with a high efficiency;

ii) being monolithically formed in combination with a light-emitting device; and iii) enabling inexpensive preparation. Also te present invention, when applied to a non-linear light modulator, enables modulation with a high response speed.

I claim:

1. A non-linear optical device for generating light of an angular frequency $2\omega$ from incident light of an angular frequency $\omega$ by means of a non-linear optical effect, comprising:
   a substrate body comprising a material selected from the group consisting of a semiconductive material and an insulating material;
   an embedded member embedded in said substrate body and comprising a direct-transition type material, selected from the group consisting of a semiconductive material and an insulating material, different from the material comprising said substrate body, wherein said embedded member has a band gap Eg satisfying a relation $Eg \approx 2h\omega$ in which $h = h/2\pi$ and h is Planck's constant, and has a size comparable to that of the Bohr radius of an exciton; and
   means for providing each of an electron and a positive hole in said embedded member with an asymmetric potential in such a manner that the wave functions of said electron and said positive hole have mutually different centers of gravity from each other.

2. A non-linear optical device according to claim 1, further comprising a filter for transmitting the light of the angular frequency $2\omega$ only.

3. A non-linear optical device according to claim 1, further comprising two layers sandwiching said substrate body and having a refractive index lower than that of said substrate body.

4. A non-linear device for generating light of an angular frequency $2\omega$ from incident light of an angular frequency $\omega$ by means of a non-linear optical effect, comprising:
   a substrate body comprising a material selected from the group consisting of a semiconductive material and an insulating material;
   an embedded member embedded in said substrate body and comprising a direct-transition type material, selected from the group consisting of a semiconductive material and an insulating material, different from the material comprising said substrate body, wherein said embedded member has a band gap Eg satisfying a relation $Eg \approx 2h\omega$ in which $h = h/2\pi$ and h is Planck's constant, and has a size comparable to that of an exciton; and
   means for providing each of an electron and a positive hole in said embedded member with an asymmetric potential in such a manner that the wave functions of said electron and said positive hole have mutually different centers of gravity from each other,
   wherein said embedded member comprises plural layer-like shapes each having a thickness approximately equal to the Bohr radius of the exciton, said plural layers being alternately laminated with plural layers formed by said substrate body.

5. A non-linear optical device for generating light of an angular frequency $2\omega$ from incident light of an angular frequency $\omega$ by means of a non-linear optical effect, comprising:
   a substrate body comprising a material selected from the group consisting of a semiconductive material and an insulating material;
   an embedded member embedded in said substrate body and comprising a direct-transition type material, selected from the group consisting of a semiconductive material and an insulating material, different from the material comprising said substrate body, wherein said embedded member has a band gap Eg satisfying a relation $Eg \approx 2h\omega$ in which $h = h/2\pi$ and h is Planck's constant and has a size comparable to that of an exciton; and
   means for providing each of an electron and a positive hole in said embedded member with an asymmetric potential in such a manner that the wave functions of said electron and said positive hole have mutually different centers of gravity from each other,
   wherein said embedded member comprises plural dot-like shapes each having a size approximately equal to the Bohr radius of the exciton, said plural dot-like shapes being dispersed in said substrate body.

6. A non-linear optical device for generating light of an angular frequency $2\omega$ from incident light of an angular frequency $\omega$ by means of a non-linear optical effect, comprising:
   a substrate body comprising a material selected from the group consisting of a semiconductive material and an insulating material;
   an embedded member embedded in said substrate body and comprising a direct-transition material, selected from the group consisting of a semiconductive material and an insulating material, different from the material comprising said substrate body, wherein said embedded member has a band gap Eg satisfying a relation $Eg \approx 2h\omega$ in which $h = h/2\pi$ and h is Planck's constant, and has a size comparable to that of the exciton;
   a pair of electrodes for applying a bias electric field across the substrate body in which said embedded member is embedded; and
   a power source for supplying an electric field between said electrodes.

7. A non-linear optical device according to claim 6, further comprising a modulator for modulating the electric field supplied by said power source.

8. A non-linear optical device according to claim 6, further comprising a filter for transmitting the light of the angular frequency $2\omega$ only.

9. A non-linear optical device according to claim 6, further comprising two layers sandwiching said substrate body and having a refractive index lower than that of said substrate body.

10. A non-linear optical device for generating light of an angular frequency $2\omega$ from incident light of an angular frequency by means of a non-linear optical effect, comprising:

a substrate body comprising a material selected from the group consisting of a semiconductive material and an insulating material;

an embedded member embedded in said substrate body and comprising a direct-transition material, selected from the group consisting of a semiconductive material and insulating material, different from the material comprising said substrate body, wherein said embedded member has a band gap Eg satisfying a relation $Eg \approx 2\hbar\omega$ in which $\hbar = h/2\pi$ and h is Planck's constant, and has a size comparable to that of an exciton;

a pair of electrodes for applying a bias electric field across the substrate body in which said embedded member is embedded; and a power source for supplying an electric field between said electrodes, wherein said embedded member comprises plural layer-like shapes each having a thickness approximately equal to the Bohr radius of the exciton, said plural layer-like shapes being alternately laminated with plural layers formed by said substrate body.

11. A non-linear optical device, for generating light of an angular frequency $2\omega$ from incident light of an angular frequency $\omega$ by means of a non-linear optical effect, comprising:

a substrate body comprising a material selected from the group consisting of a semiconductive material and an insulating material;

an embedded member embedded in said substrate body and comprising a direct-transition material, selected from the group consisting of a semiconductive material and an insulating material, different from the material comprising said substrate body, wherein said embedded member has a band gap Eg satisfying a relation $Eg \approx 2\hbar\omega$ in which $\hbar = h/2\pi$ and h is Planck's constant, and has a size comparable to that of an exciton;

a pair of electrodes for applying a bias electric field across the substrate body in which said embedded member is embedded; and a power source for supplying an electric field between said electrodes, wherein said embedded member comprises plural dot-like shapes each having a size approximately equal to the Bohr radius of the exciton, said plural dot-like shapes being dispersed in said substrate body.

12. A non-linear optical device for generating light of an angular frequency $2\omega$ from incident light of an angular frequency $\omega$ by means of a non-linear optical effect, comprising:

a substrate body comprising a material selected from the group consisting of a semiconductive material and an insulating material;

plural embedded members embedded in said substrate body and comprising a direct-transition compound semi-conductor, different from the material comprising said substrate body, wherein said embedded members have a band gap Eg satisfying a relation $Eg \approx 2\hbar\omega$ in which $\hbar = h/2\pi$ and h is Planck's constant, have a size approximately equal to that of the Bohr radius of an exciton, and have a composition of said compound semiconductor gradually varying according to the position of each of said members in said substrate body.

13. A non-linear optical device according to claim 12, further comprising a filter for transmitting the light of the angular frequency $2\omega$ only.

14. A non-linear optical device according to claim 12, further comprising two layers sandwiching said substrate body and having a refractive index lower than that of said substrate body.

15. A non-linear optical device for generating light of an angular frequency $2\omega$ from incident light of an angular frequency $\omega$ by means of a non-linear optical effect, comprising:

a substrate body comprising a material selected from the group consisting of a semiconductive material and an insulating material;

plural embedded members embedded in said substrate body and comprising a direct-transition compound semi-conductor different from the material comprising said substrate body, wherein said embedded members have a band gap Eg satisfying a relation $Eg \approx 2\hbar\omega$ in which $\hbar = h/2\pi$ and h is Planck's constant, have a size approximately equal to that of the exciton, and have a composition of said compound semiconductor gradually varying according to the position of each of said members in said substrate body, wherein said embedded member comprises plural layer-like shapes each having a thickness approximately equal to the Bohr radius of the exciton, said plural layer-like shapes being alternately laminated with plural layers formed by said substrate body.

16. A non-linear optical device for generating light of an angular frequency $2\omega$ from incident light of an angular frequency $\omega$ by means of a non-linear optical effect, comprising:

a substrate body comprising a material selected from the group consisting of a semiconductive material and an insulating material;

plural embedded members embedded in said substrate body and comprising a direct-transition compound semi-conductor different from the material comprising said substrate body, wherein said embedded members have a band gap Eg satisfying a relation $Eg \approx 2\hbar\omega$ in which $\hbar = h/2\pi$ and h is Planck's constant, have a size approximately equal to that of the exciton, and have a composition of said compound semiconductor gradually varying according to the position of each of said members in said substrate body, wherein said embedded member comprises plural dot-like shapes each having a size approximately equal to the Bohr radius of the exciton, said plural dot-like shapes being dispersed in said substrate.

* * * * *

UNITED STATES PATENT AND TRADEMARK OFFICE
CERTIFICATE OF CORRECTION

PATENT NO. : 5,059,001
DATED : October 22, 1991
INVENTOR(S) : AKIRA SHIMIZU

It is certified that error appears in the above-identified patent and that said Letters Patent is hereby corrected as shown below:

Title page,
item [56] REFERENCES CITED

Other Publications,
        "Kkurgin, J." should read --Khurgin, J.--.

Title page,
item [57] ABSTRACT

Line 10, "Eg≈2nω" should read --Eg≈2$\hbar$ω-- and
        "n=h/2π" should read --n=$\hbar$/2π--.
    Line 11, "Planck" should read --Planck's--.
    Line 16, "fron" should read --from--.

COLUMN 1

Line 14, "proposed" should read --been proposed--.
    Line 39, "drawbacks;" should read --drawbacks:--.

COLUMN 2

Line 1, "Eg≈2hω" should read --Eg≈2$\hbar$ω-- and
        "h=h/2π" should read --$\hbar$=h/2π-- and
        "Planck" should read --Planck's--.
    Line 18, "2hω≈Eg." should read --2$\hbar$ω≈Eg.--.

COLUMN 3

Line 16, "2hω≈Eg" should read 2$\hbar$ω≈Eg--.
    Line 18, "h=h/2π" should read --$\hbar$=h/2π-- and
        "Planck" should read --Planck's--.
    Line 29, "7,8." should read --7, 8.--.
    Line 31, "sse-" should read --se- --.
    Line 61, "center" should read --centers--.

UNITED STATES PATENT AND TRADEMARK OFFICE
CERTIFICATE OF CORRECTION

PATENT NO. : 5,059,001

DATED : October 22, 1991

INVENTOR(S) : AKIRA SHIMIZU

It is certified that error appears in the above-identified patent and that said Letters Patent is hereby corrected as shown below:

COLUMN 4

Line 11, "structure 13, that" should read --structure 13. That structure--.
Line 38, "FIG. 8" should read --FIG. 3--.

COLUMN 5

Line 13, "te" should read --the--.
Line 30, "Eg≈2hω" should read --Eg×2$\hbar$ω--.
Line 31, "h=h/2π" should read --$\hbar$=h/2π--.
Line 47, "non-linear device" should read --non-linear optical device--.
Line 60, "Eg≈2hω" should read --Eg≈2$\hbar$ω--.
Line 61, "h=h/2π" should read --$\hbar$=h/2π--.

COLUMN 6

Line 19, "Eg⇌2hω" should read --Eg≈2$\hbar$ω--.
Line 20, "h=h/2π" should read --$\hbar$=h/2π-- and "constant" should read --constant,--.
Line 47, "Eg≈2hω" should read --Eg≈2$\hbar$ω--.
Line 48, "h=h/2π" should read --$\hbar$=h/2π--.

COLUMN 7

Line 10, "Eg≈2hω" should read --Eg≈2$\hbar$ω-- and "h=h/2π" should read --$\hbar$=h/2π--.
Line 23, "device," should read --device--.
Line 36, "Eg≈2hω" should read --Eg≈2$\hbar$ω--.
Line 37, "h=h/2π" should read --$\hbar$=h/2π--.

UNITED STATES PATENT AND TRADEMARK OFFICE
CERTIFICATE OF CORRECTION

PATENT NO. : 5,059,001
DATED : October 22, 1991
INVENTOR(S) : AKIRA SHIMIZU

It is certified that error appears in the above-identified patent and that said Letters Patent is hereby corrected as shown below:

COLUMN 8

Line 1, ""$Eg \approx 2h\omega$" should read --$Eg \approx 2\hbar\omega$-- and "$h=h/2\pi$" should read --$\hbar=h/2\pi$--.

Line 26, ""$Eg \approx 2h\omega$" should read --$Eg \approx 2\hbar\omega$-- and "$h=h/2\pi$" should read --$\hbar=h/2\pi$--.

Line 50, ""$Eg \approx 2h\omega$" should read --$Eg \approx 2\hbar\omega$-- and "$h=h/2\pi$" should read --$\hbar=h/2\pi$--.

Signed and Sealed this

Twenty-eighth Day of September, 1993

Attest:

BRUCE LEHMAN

*Attesting Officer*  *Commissioner of Patents and Trademarks*